(12) United States Patent
Aiba (10) Patent No.: US 7,715,115 B2
(45) Date of Patent: May 11, 2010

(54) LENS DEVICE

(75) Inventor: Daigo Aiba, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 37 days.

(21) Appl. No.: 11/928,712

(22) Filed: Oct. 30, 2007

(65) Prior Publication Data

US 2008/0106805 A1 May 8, 2008

(30) Foreign Application Priority Data

Nov. 6, 2006 (JP) ............... P2006-300341

(51) Int. Cl.
*G02B 3/00* (2006.01)
*G02B 5/20* (2006.01)
*G02B 5/22* (2006.01)

(52) U.S. Cl. ................. 359/723; 359/889

(58) Field of Classification Search ........... 359/722, 359/723, 691, 692, 676, 677, 885, 888, 889; 348/342, 360, 361
See application file for complete search history.

(56) References Cited

U.S. PATENT DOCUMENTS

| 4,316,659 | A | * | 2/1982 | Daniels | .............. | 396/179 |
| 5,070,407 | A | | 12/1991 | Wheeler et al. | | |
| 6,856,466 | B2 | * | 2/2005 | Tocci | .............. | 359/723 |
| 7,113,318 | B2 | | 9/2006 | Onuki et al. | | |
| 2002/0003583 | A1 | * | 1/2002 | Arai | .............. | 348/363 |
| 2006/0192884 | A1 | * | 8/2006 | Tsuda | .............. | 348/342 |

FOREIGN PATENT DOCUMENTS

| JP | 2000-152072 A | 5/2000 |
| JP | 2002-174839 A | 6/2002 |
| JP | 2003-131189 A | 5/2003 |
| JP | 2004-333554 A | 11/2004 |
| JP | 2005-24836 A | 1/2005 |
| JP | 2006-78666 A | 3/2006 |

\* cited by examiner

*Primary Examiner*—Alicia M Harrington
(74) *Attorney, Agent, or Firm*—Birch, Stewart, Kolasch, & Birch, LLP.

(57) ABSTRACT

A lens device comprises: an image-formation optical system that converges an incident luminous flux at an imaging element, to form an image; a diaphragm mechanism provided in the image-formation optical system; and a filter section that is provided on a subject side of the imaging element and through which the luminous flux incident on the image-formation optical system travels, wherein the filter section comprises: an infrared-ray cutoff filter; and a neutral density filter, and wherein the lens device further comprises a filter switching mechanism that places the infrared-ray cutoff filter and the neutral density filter in a range through which the luminous flux travels at the time of photographing of a high-luminance subject.

5 Claims, 6 Drawing Sheets

LENS DEVICE

BACKGROUND OF THE INVENTION

1. Field of the Invention

The present invention relates to a lens device and is particularly suitable for application to a lens device of a surveillance camera.

2. Description of the Related Art

Surveillance cameras (CCTV cameras for surveillance purpose) are widely used in branches of a financial institution or shops for selling merchandise with a view toward preventing crime. A high-sensitivity surveillance camera capable of capturing an image at a low light level is recently put into practical use.

When a high-luminance subject is photographed, an amount of light radiated on an imaging element of the surveillance camera must be reduced to a small aperture. To this end, a diaphragm is set to a smaller value, or there is performed operation for decreasing the speed of an electronic shutter of the imaging element. However, when the diaphragm of the lens is reduced, a diffraction phenomenon occurs in a light ray passing through the diaphragm, which in turn deteriorates an image. Therefore, there is adopted a technique for attaching an ND filter to a diaphragm vane, to thus reduce the amount of light and make an opening of the aperture wider.

However, when the ND filter is attached to the diaphragm vane, the amount of light acquired when a high-luminance subject is photographed can be reduced. However, the amount of light is also decreased during opening of the diaphragm, which hinders photographing of a low-luminance subject and raises a problem of an increase in the minimum illuminance of the subject. In the meantime, in order to decrease the minimum illuminance of the subject, it is desirable that the density of the ND filter should be decreased. However, the amount of light cannot be decreased sufficiently when a high-luminance subject is photographed. Therefore, there arises a necessity for reducing the aperture of the diaphragm to a much greater extent. For this reason, there exists a problem of deterioration of image quality being induced by the diffraction phenomenon. In particularly, in the case of a supersensitive camera, an increase in the density of the ND filter poses difficulty on the camera to perform photographing at a dark place, which is the original merit of the camera.

When the speed of an electronic shutter is increased to reduce the amount of light during photographing of a high-luminance subject, the imaging element remains exposed to light of high luminance at all times rather than undergoes light attenuation caused by the diaphragm or the ND filter. Therefore, when the high-luminance subject is photographed by increasing the speed of the electronic shutter, a phenomenon (smear)—appearance of linear light on a photographed image—is likely to arise, which raises a problem of deterioration of image quality.

When a high-luminance subject is photographed by means of a supersensitive camera, the shutter speed must be increased further, and a critical shutter speed which is faster than the shutter speed of a normal camera is readily achieved. Therefore, there arises a problem of smear becoming more likely to arise. Even when the amount of light is reduced by means of the diaphragm, the aperture of the diaphragm must be reduced further because the camera is highly sensitive. Therefore, a diffraction phenomenon of the diaphragm becomes more likely to arise, which leads to a problem of deterioration of an image.

SUMMARY OF THE INVENTION

Accordingly, the present invention has been conceived in light of the above problems and aims at providing a novel, improved lens device capable of reducing the amount of light at the time of photographing of a high luminance subject while preventing deterioration of image quality.

In order to solve the problem, according to a certain aspect of the present invention, there is provided a lens device comprising: an image-formation optical system that converges an incident luminous flux at an imaging element, to form an image; a diaphragm mechanism provided in the image-formation optical system; and a filter section that is provided on a subject side of the imaging element and through which the luminous flux incident on the image-formation optical system travels, wherein the filter section comprises: an infrared-ray cutoff filter; and a neutral density filter, and wherein the lens device further comprises a filter switching mechanism that places the infrared-ray cutoff filter and the neutral density filter in a range through which the luminous flux travels at the time of photographing of a high-luminance subject.

By means of the above configuration, the filter section through which the luminous flux incident on the image-forming optical system travels has at least the infrared-ray cutoff filter and the neutral density filter. When a high-luminance subject is photographed, the infrared-ray cutoff filter and the neutral density filter are placed in the range through which the luminous flux travels, by means of the filter switching mechanism. Accordingly, the amount of light radiated onto the imaging element can be reduced by means of the neutral density filter, and the aperture of the diaphragm mechanism can be opened further. Thus, occurrence of a diffraction phenomenon, which would otherwise be caused by the light traveling through the diaphragm, is prevented, and occurrence of smear can be reduced. Moreover, when the neutral density filter is attached to the vane of the diaphragm mechanism, the density of the neutral density filter of the vane can be reduced. Therefore, the minimum photographable illuminance of the subject can be reduced.

Further, the infrared-ray cutoff filter may comprises a first infrared-ray cutoff filter and a second infrared-ray cutoff filter, and the filter section may also comprises the first infrared-ray cutoff filter, and a composite filter into which the second infrared-ray cutoff filter and the neutral density filter are superimposed integrally one on top of the other. The filter switching mechanism may also place the composite filter in a range through which the luminous flux travels at the time of photographing of a high-luminance subject. By means of such a configuration, the position of the infrared-ray cutoff filter and the position of the neutral density filter can be controlled simultaneously by controlling the position of the infrared-ray cutoff filter. Hence, switching of the filters can be readily performed without involvement of complicate control operation.

The lens device may further comprise an F-number acquisition section for acquiring an F-number of the diaphragm mechanism, and the filter switching mechanism may cause the composite filter to recede from the range through which the luminous flux travels when the F-number is a first predetermined value or less and a second predetermined value or above and places the first infrared-ray cutoff filter in the range through which the luminous flux travels. By virtue of the configuration, when the F-number comes to the first predetermined value or less as a result of a reduction in the luminance of the subject, the neutral density filter is caused to recede from the range through which the luminous flux travels, so that the amount of light radiated on the imaging element can be increased.

The filter section may further have a clear filter that causes the luminous flux to pass through, and the filter switching mechanism may also place the clear filter in the range through which the luminous flux travels, when the F-number is less than the second predetermined value. By means of the configuration, when the F-number is less than the second predetermined value, the clear filter is placed in the range through which the luminous flux travels, and hence light of an IR range can also be acquired when a low-luminance subject is photographed, so that an image having a sufficient amount of light can be acquired.

DETAILED DESCRIPTION OF THE INVENTION

A preferred embodiment of the present invention will be described in detail hereunder by reference to the accompanying drawings. Throughout the specification and drawings, constituent elements having essentially-identical functional configurations are assigned the same reference numerals, and their repeated explanations are omitted.

Figure 1:
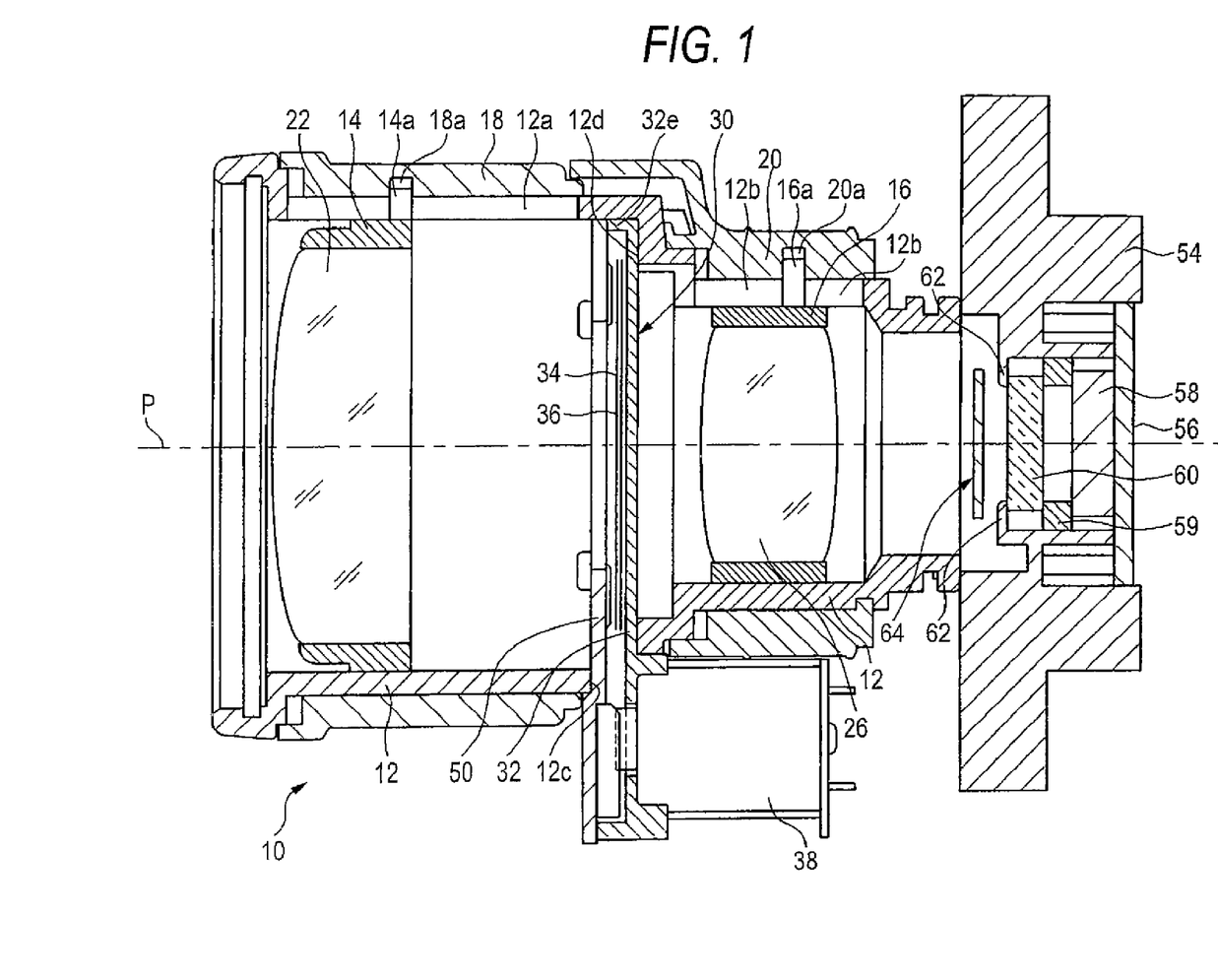
FIG. 1 is a view of a lens device (barrel) of an embodiment of the present invention; that is, a cross-sectional view showing a cross section taken along an optical axis P.

FIG. 1 is a view showing a lens device (barrel) of an embodiment of the present invention; that is, a cross-sectional view showing a cross section taken along an optical axis P. First, by reference to FIG. 1, the overall structure of the lens device 10 will be described. As shown in FIG. 1, the lens device 10 has a stationary barrel 12. The stationary barrel 12 is equipped with a diaphragm mechanism 30. The stationary barrel 12, a lens frame 14 is disposed at the front (i.e., at a subject-side) of the diaphragm mechanism 30, and a lens frame 16 is disposed at the rear of the diaphragm mechanism 30. A focus ring 18 and a zoom ring 20 are disposed outside of the stationary barrel 12.

The lens frame 14 is for retaining a focusing lens (group) 22. An engagement pin 14a projecting from a periphery of the lens frame 14 is attached to the lens frame 14. Further, a rectilinear groove 12a is formed in the stationary barrel 12 toward the optical axis. As a result of the engagement pin 14a being engaged with the rectilinear groove 12a, the lens frame 14 and the focus lens 22 are moved rectilinearly in the direction of the optical axis while being guided by the rectilinear groove 12a.

The lens frame 16 is for retaining a focusing lens (group) 26. An engagement pin 16a projecting from a periphery of the lens frame 16 is attached to the lens frame 16. Further, a rectilinear groove 12b is formed in the stationary barrel 12 toward the optical axis. As a result of the engagement pin 16a being engaged with the rectilinear groove 12b, the lens frame 16 and a zoom lens 26 are moved rectilinearly in the direction of the optical axis while being guided by the rectilinear groove 12b.

A focus ring 18 is movably arranged at a position—where the lens frame 14 is disposed—on the outer periphery of the stationary barrel 12. A cam groove 18a which is helical with respect to the optical axis is formed along an inner peripheral surface of the focus ring 18. The engagement pin 14a attached to the lens frame 14 meshes with the cam groove 18a of the focus ring 18. Accordingly, when the focus ring 18 is rotatably actuated, the position of an intersection of the cam groove 18a of the focus ring 18 and the rectilinear groove 12a of the stationary groove 12 is displaced in the direction of the optical axis. Further, the engagement pint 14a, the lens frame 14, and the focus lens 22 are displaced in the direction of the optical axis in accordance with the position of the intersection. Thus, the set position of the focus lens 22 is adjusted by rotating the focus ring 18, thereby enabling adjustment of a focus.

The zoom lens 20 is disposed, in a rotatable manner, on an outer peripheral surface of the stationary barrel 12 at a position where the lens frame 16 is to be disposed. A cam groove 20a which is helical with respect to the optical axis is formed along an inner peripheral surface of the zoom ring 20. The engagement pin 16a attached to the lens frame 16 is engaged with the cam groove 20a of the zoom ring 20. Consequently, when the zoom ring 20 is rotationally actuated, the position of the intersection of the cam groove 20a of the zoom ring 20 and the rectilinear groove 12b of the stationary barrel 12 is displaced in the direction of the optical axis. Further, the engagement pint 16a, the lens frame 16, and the zoom lens 26 are displaced in the direction of the optical axis in accordance with the position of the intersection. Thus, the set position of the zoom lens 20 is adjusted by rotating the zoom ring 20, thereby enabling adjustment of a focal distance (a zoom angle of view).

In the present embodiment, an image-pickup optical system of the lens device 10 is built from the focus lens (group) 22 and a zoom lens (group) 26. An incident luminous flux originating from the subject is converged to a CCD 58 by means of the focus lens (group) 22 and the zoom lens (group) 26, to thus form an image. In the present embodiment, the lenses of a front group are imparted with a focusing function, and the lenses of a rear group are imparted with a zooming function. However, the lenses of the front group may also be provided with the zooming function, and the lenses of the rear group may also be provided with the focusing function.

The diaphragm mechanism 30 has a diaphragm frame 32, two vanes 34 and 36, a drive device (drive means) 38 for driving the vanes, and a lever 40 (not shown in FIG. 1) fixed to a drive shaft 38a of the drive device 38. Further, as shown in FIG. 1, a diaphragm mechanism cover 50 is disposed in front of the diaphragm mechanism 30.

Figure 2:
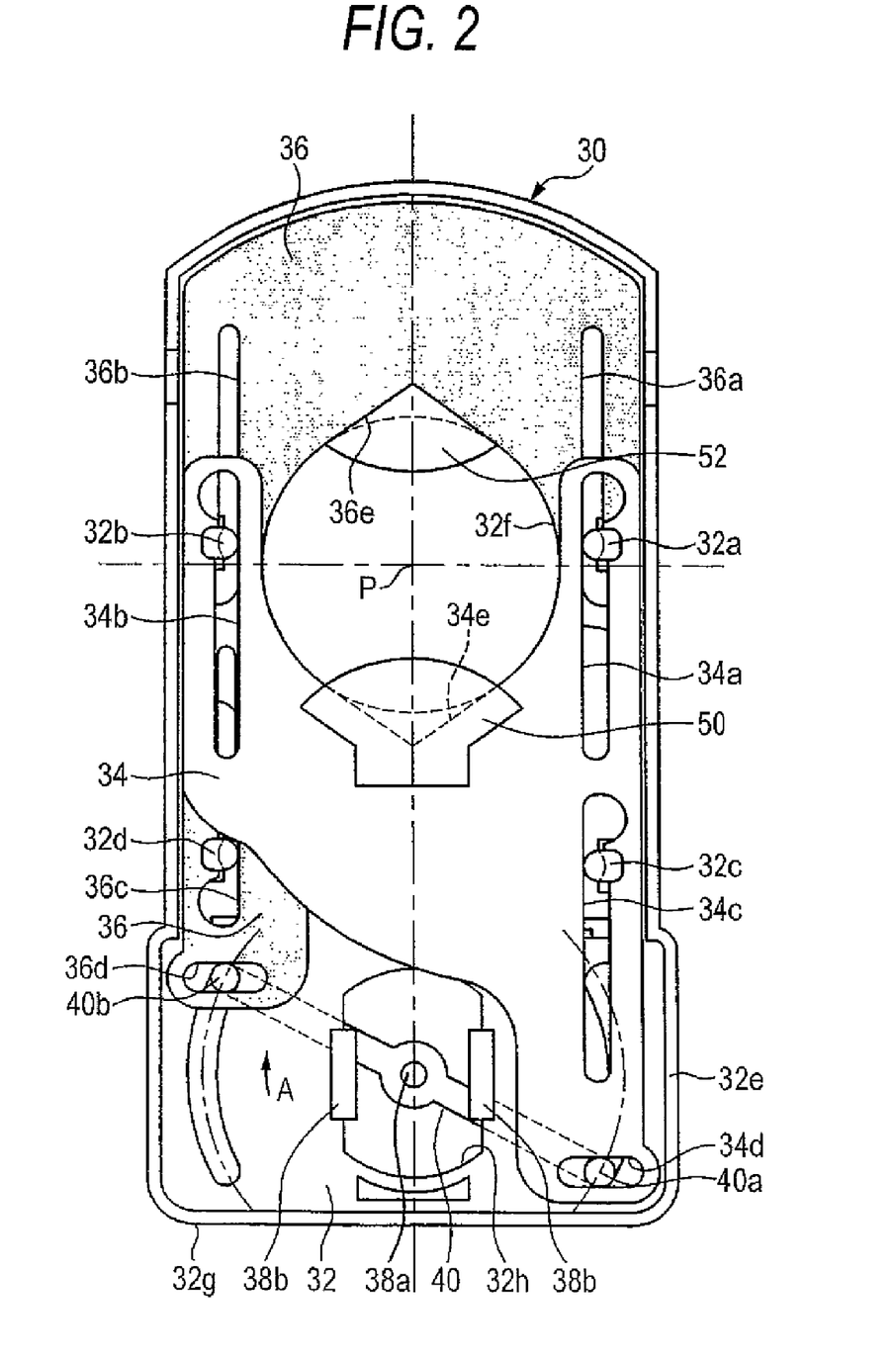
FIG. 2 is a view of a planar configuration of a diaphragm mechanism, showing the state of the diaphragm mechanism when viewed from a subject side.

FIG. 2 is a view of a planar configuration of the diaphragm mechanism 30, showing the state of the diaphragm mechanism 30 when viewed from the subject side.

As shown in FIG. 2, the diaphragm mechanism 30 has a diaphragm frame 32. The diaphragm frame 32 has a circular aperture 32f centered at the optical axis P and a rib 32e. As shown in FIGS. 1 and 2, the rib 32e is provided along a rim portion of the diaphragm frame 32 so as to protrude toward the subject side.

As shown in FIG. 2, the vane 34 located on the subject side has an elongated aperture section 34a, an aperture section 34*b*, and an aperture section 34*c*. Further, the diaphragm frame 32 has engagement pins 32*a*, 32*b*, 32*c*, and 32*d* which project toward the subject side. The aperture sections 34*a*, 34*b*, and 34*c* are engaged with three engagement pins 32*a*, 32*b*, and 32*c*, respectively.

Likewise, the vane 36 is provided with an aperture section 36*a*, an aperture section 36*b*, and an aperture section 36*c*. The aperture sections 36*a*, 36*b*, and 36*c* are engaged with the three engagement pins 32*a*, 32*b*, and 32*d* provided on the diaphragm fame 32, respectively. In order to ensure engagement with the vanes 34 and 36, diameters of the leading ends of the respective engagement pins 32*a*, 32*b*, 32*c*, and 32*d* are enlarged.

The vane 34 is provide with a cutout 34*e* corresponding to an aperture 32*f* of the diaphragm frame 32. Further, the vane 36 is provided with a cutout 36*e* corresponding to the aperture 32*f* of the diaphragm frame 32. The cutouts 34*e* and 36*e* assume the same circular-arc shape as that of the aperture 32*f* of the diaphragm frame 32, and extremities of the cutouts are formed into a sharp-pointed shape. When the vane 34 and the vane 36 are fully opened, the size of the aperture of the diaphragm becomes identical with the size of the aperture 33*f*. When the vanes 34 and 36 are actuated in a direction where the cutout 34*e* and the cutout 36*e* approach each other, the aperture of the diaphragm becomes smaller.

An ND filter (a neutral density filter) 50 is attached to a sharp-pointed area of the extremity of the cutout 34*e* on the subject side of the vane 34. Further, an ND filter 52 is attached to a sharp-pointed area of the extremity of the cutout 36*e* on the imaging-element side of the vane 36.

As shown in FIG. 1, the drive device 38 is attached to a lower portion of the diaphragm frame 32. The drive device 38 is attached to the diaphragm frame 32 from the back. As shown in FIG. 2, the drive shaft 38*a* of the drive device 38 is oriented toward the diaphragm frame 32, and a lever 40 is attached to the drive shaft 38*a*. An engagement pin 40*a* and another engagement pin 40*b* are provided at both ends of the lever 40. The engagement pin 40*a* is engaged with the aperture section 34*d* formed in the vane 34, and the engagement pin 40*b* is engaged with the aperture section 36*d* formed in the vane 36.

One of the vanes 34 and 36 is equipped with a magnet, and an F-number conforming to the positions of the vanes 34 and 36 is detected by means of a magnetic resistance effect of a hall element (not shown). Now, the greater an output from the hall element, the smaller the F-number. However, a relationship between the output from the hall element and the F-number can be set arbitrarily.

As shown in FIG. 1, an opening section 12*c* is formed, between the focus ring 18 and the zoom ring 20, in a lower portion of the outer periphery of the stationary barrel 12 so as to penetrate through the inside thereof. The diaphragm mechanism 30 is inserted into and fixed to the stationary barrel 12 from the opening section 12*c* along with the diaphragm mechanism cover 50.

As shown in FIG. 1, an imaging element holder 54 is attached to a rear-end portion of the stationary barrel 20. The imaging element holder 54 is provided with a substrate 56. A CCD (imaging element) 58 is implemented on the substrate 56. Seal rubber 59 is provided on the front side of the CCD 58, and a low-pass filter (OLPF) 60 is also provided at the forward of the seal rubber 59. A front portion of the low-pass filter 60 remains in contact with a retaining section 62 of the imaging element holder 54.

FIG. 2 shows a state where the lever 40 is actuated most in the direction of arrow A by means of the drive device 38. In this state, the vane 34 is situated at the lowermost position in FIG. 2, and the vane 36 is situated at the highest position. Accordingly, as shown in FIG. 2, the cutout 34*e* of the vane 34 and the cutout 36*e* of the vane 36 are separated from each other, whereby the opening 32*f* of the aperture frame 32 is formed.

In the meantime, when the lever 40 is actuated in a direction opposite the direction of the arrow A from the state shown in FIG. 2, the opening formed by the vane 34 and the vane 36 becomes smaller. Thus, the positions of the ND filters 50 and 52 become close to the optical axis P. Accordingly, as a result of a reduction in the area of the opening, the amount of light is decreased, and a proportion of an area occupied by the ND filters within the opening is increased, so that the amount of light traveling through the diaphragm mechanism 30 is diminished.

At that time, the amount of light is reduced by the ND filters 50 and 52. When compared with the case where the ND filters 50 and 52 are not provided, the same amount of light can be caused to enter the CCD 59 while the opening formed by the vanes 34 and 36 is made larger. Consequently, the opening can be made greater, and the chance of occurrence of a diffraction phenomenon, which would otherwise be caused when light travels through the diaphragm, can be lessened.

Figure 3:
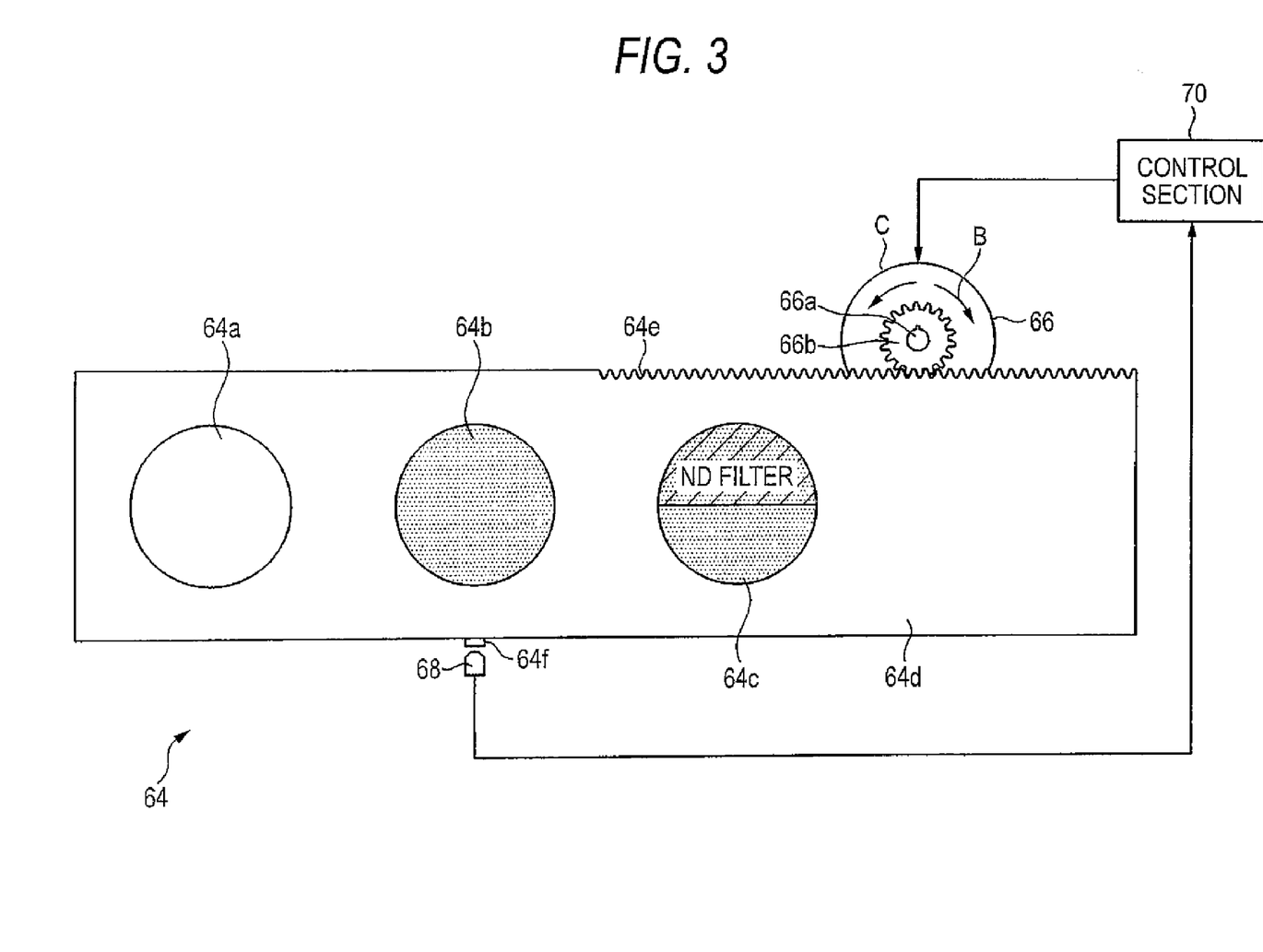
FIG. 3 is a schematic diagram of the structure of a filter mechanism, showing the filter mechanism when viewed from the subject side.

A filter mechanism 64 is disposed on the forward of the low-pass filter 60. FIG. 3 is a schematic diagram of the structure of the filter mechanism 64, showing the filter mechanism 64 when viewed from the subject side. As shown in FIG. 3, the filter mechanism 64 is provided with three filters; namely, a clear filter 64*a*, an IR cutoff filter 64*b*, and an IR cutoff filter+ND filter 64*c*. These three filters are provided on a base material 64*d*. Switching among the three filters is performed by means of; for example, a drive device 66.

The clear filter 64*a* is an optical filter formed by evaporating an antireflection coating on colorless plain glass, and causes an incident light ray to pass to the CCD 58. The clear filter 64*a* is primarily used for photographing low-luminance subject at nighttime.

The IR cutoff filter 64*b* is an ordinary filter used for photographing at daytime and has a function of cutting infrared light.

The IR cuoff+ND filter 64*c* is a composite filter formed by adding the function of the ND filter (a neutral density filter) to the function of the IR cutoff filter. As shown in FIG. 3, the entirety of the IR cutoff+ND filter 64*c* has the function of the IR cutoff filter, and the function of the ND filter is added to essentially one-half of the entirety. Moreover, although there is shown a configuration in which the ND filter is superimposed at one-half area of the entire filter, the IR cutoff filter and the ND filter may also be arranged side by side, while remaining separated from each other, in the direction of the optical axis.

The drive device 66 is built from a stepping motor. A drive shaft 66*a* of the drive device 66 is provided with a pinion gear 66*b*. The pinion gear 66*b* is engaged with a rack 64*e* provided on a base material 64*d*. Accordingly, when the drive device 66 is driven, the base material 64*d* is driven in a longitudinal direction thereof. The base material 64*d* is driven to a position where the center of any one of the clear filter 64*a*, the IR cutoff filter 64*b*, and the IR cutoff+ND filter 64*c* coincides with the optical axis P of the lens device.

A reset switch 68 for detecting the initial position of the base material 64*d* is provided adjacent to the base material 64*d*. The reset switch 68 is a switch which is turned on when the position of the base material 64*d* is set to the initial position. The reset switch 68 is built from a sensor which optically reads the position of a projection 64*f* of the base material 64*d*. The initial position of the base material 64*d* can be taken as; for example, a position where the IR cutout filter 64*b* is placed on the optical axis P. Accordingly, in accordance with the activated or deactivated status of the reset switch 68, the IR cutoff filter 64*b* can be placed on the optical axis P. Moreover, the clear filter 64*a* or the IR cutoff+ND filter 64*c* can be placed on the optical axis P by means of driving the drive device 66 from the initial position by a predetermined number of steps in a predetermined direction.

The drive device 66 and the reset switch 68 are connected to a control section 70. Further, the CCD 58 and the drive device 38 are also connected to the control section 70. Moreover, an output from the hall element for detecting an F-number of the diaphragm is inputted to the control section 70. In accordance with the amount of light incident on the CCD 58 and the output from the hall element, the control section 70 can drive the drive device 38 and the drive device 66.

In the lens device 10 of the present embodiment configured as mentioned above, when photographing is performed at a comparatively bright location at daytime, the IR cutoff filter 64*b* is placed at the position of the optical axis P, whereby infrared light is eliminated from the light ray incident on the lens device 10. Further, when photographing is performed at dark location at nighttime, the clear filter 64*a* is placed at the position of the optical axis P. Further, when a high-luminance subject is photographed at daytime, the IR cutoff+ND filter 64*c* is placed at the position of the optical axis P.

Figure 4:
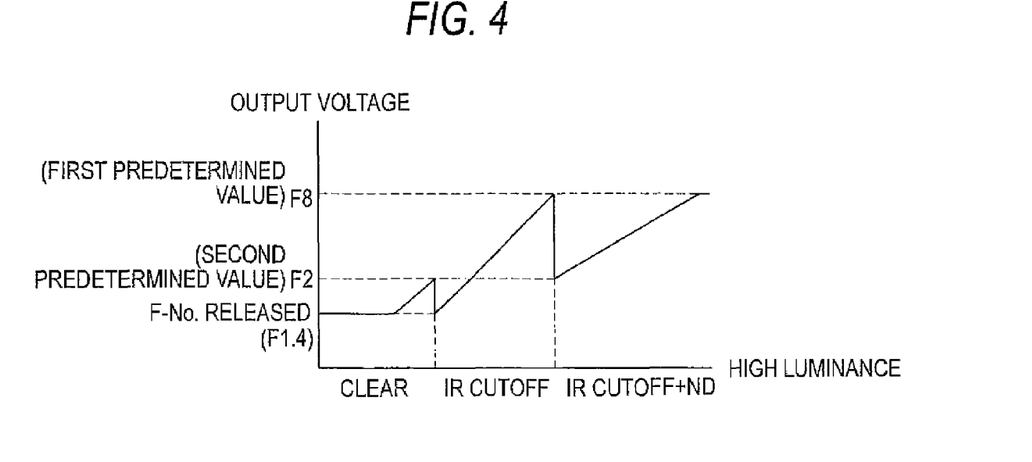
FIG. 4 is a schematic view showing that filters are switched according to luminance of a subject.
Figure 5:
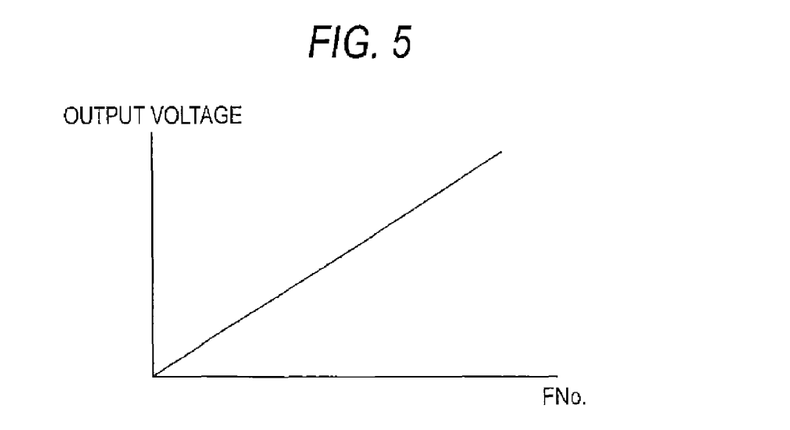
FIG. 5 is a schematic view showing a relationship between a voltage output by a hall element and an F-number.

FIG. 4 is a schematic view showing that the filters 64*a*, 64*b*, and 64*c* are switched according to luminance of the subject. In FIG. 4, a vertical axis represents a voltage output by the hall element that detects an F-number, and a horizontal axis represents the luminance of a subject. FIG. 5 shows a relationship between a voltage output by the hall element and an F-number. As shown in FIG. 5, the greater the voltage output by the hall element, the greater the value of the F-number, and the smaller the aperture of the diaphragm.

As shown in FIG. 4, when a subject of low luminance is photographed, the clear filter 64*a* is placed at the position of the optical axis P. When the luminance of the subject is increased in this state, the aperture of the diaphragm mechanism 30 is reduced according to luminance, and the voltage (i.e., the value of an F-number) output by the hall element is increased. When the F-number reaches a first predetermined value, the clear filter 64*a* is switched to the IR cutoff filter 64*b*. As a result, the IR cutoff filter 64*b* is placed at the position of the optical axis P. As a result, the amount of light radiated on the CCD 58 is reduced, and hence the aperture of the diaphragm mechanism 30 is opened. The value of the F-number achieved immediately after switching of the filter comes to a second predetermined value.

When the luminance of the subject is increased while the IR cutoff filter 64*b* is situated at the position of the optical axis P, the aperture of the diaphragm mechanism 30 becomes smaller according to luminance, whereby the value of the F-number increases. When the f-number has reached the first predetermined value, the IR cutoff filter 64*b* is switched to the IR cutoff+ND filter 64*c*. As a result, the IR cutoff+ND filter 64*c* is placed at the position of the optical axis P, whereupon the amount of light radiated on the CCD 58 is reduced, and hence the aperture of the diaphragm mechanism 30 is opened. The value of the F-number acquired immediately after switching of the filters comes to the second predetermined value. When the luminance of the subject is further increased while the IR cutoff+ND filter 64*c* is situated at the position of the optical axis P, the aperture of the diaphragm 30 is reduced, whereby the value of the F-number increases.

Detailed explanations are provided hereunder for the case where a subject of high luminance is photographed while the IR cutoff+ND filter 64*c* is situated at the position of the optical axis P. Conditions for photographing a subject of high luminance are usually conditions for daytime, and infrared radiation must be cut off. As mentioned previously, the IR cutoff+ND filter 64*c* is formed by adding the function of the ND filter to the function of the IR cutoff filter. Therefore, even when a subject of high luminance is photographed, the infrared radiation can be cut thoroughly by means of the IR cutoff+ND filter 64*c*.

Further, in the IR cutoff+ND filter 64, an ND filter is provided in essentially one-half of the entirety. Therefore, when a subject of high luminance is photographed, the amount of light incident on the lens device 10 is reduced by means of the IR cutoff+ND filter 64*c*.

At the time of photographing of the subject of high luminance, the vane 34 and the vane 36 are closed so as to make the aperture of the diaphragm mechanism 30 small in order to reduce the amount of light radiated on the CCD 58. Therefore, the amount of light is reduced by the vanes 34 and 36 of the diaphragm mechanism 30 and the ND filters 50 and 52, either.

As mentioned above, according to the present embodiment, the amount of light can be reduced by means of the IR cutoff+ND filter 64*c* of the filter mechanism 60 and the diaphragm mechanism 30. Therefore, when compared with the case where amount of light is reduced by means of only the diaphragm, the aperture diameter of the diaphragm can be increased. Consequently, at the time of photographing of the subject of high luminance, occurrence of a diffraction phenomenon, which would otherwise be caused by the light rays traveling through the diaphragm, can be prevented.

Since the amount of light can be reduced by means of the IR cutoff+ND filter 64*c* of the filter mechanism 64 and the diaphragm mechanism 30, the amount of light radiated on the CCD 58 can be reduced sufficiently. Accordingly, the amount of light radiated directly on the CCD 58 can be reduced, thereby preventing occurrence of smear, which would otherwise be caused by the electronic shutter, without fail. More preferably, it is desirable that a value obtained by addition of the density of the ND filter of the IR cutoff+ND filter 64*c* to the densities of the ND filters 50 and 52 should be made larger than the density of the ND filter provided in the related-art diaphragm mechanism. As a result, when compared with the related-art lens device which reduces the amount of light by means of only the diaphragm mechanism, the lens device of the present invention can reliably reduce the amount of light incident on the CCD 58, and hence the aperture of the diaphragm can be made larger. Therefore, occurrence of a diffraction phenomenon, which would otherwise be caused by light rays traveling through the diaphragm, can be prevented.

When the IR cutoff+ND filter 64*c* is not provided, light acquired in the lens device 10 must be reduced by means of only the diaphragm mechanism 30. However, as a result of provision of the IR cutoff+ND filter 64*c*, a portion of the amount of reduction in light quantity of the diaphragm mechanism 30 can be imposed on the IR cutoff+ND filter 64*c*. Accordingly, when compared with the case where the IR cutoff+ND filter 64*c* is not provided, the densities of the ND filters 50 and 52 can be reduced further. As a result, when photographing is performed with the diaphragm released, a decrease in the amount of light caused by the ND filters 50 and 52 can be minimized. In particular, during photographing performed at a dark place at night time, a decrease in the amount of night caused by the ND filters 50 and 52 can be suppressed without fail, so that the minimum photographable illuminance of the subject can be reduced.

Since the IR cutoff+ND filter 64*c* is not used particularly for the case of photographing of a low-luminance subject, the minimum photographable illuminance of the subject does not change even when the ND filter of the IR cutoff+ND filter 64c is made sufficiently dark. Consequently, light can be sufficiently attenuated during photographing of a high-luminance subject while the minimum photographable illuminance of the subject is reduced.

Moreover, even when a high-luminance subject is photographed by means of a high-sensitive camera, such as an ICCD camera, the amount of light can be reduced by means of switching the filter to the IR cutoff+ND filter 64c at the time of photographing of the high-luminance subject. Thus, it becomes possible to make the speed of the electronic shutter less likely to reach a critical speed on the high-speed side. Therefore, the aperture of the diaphragm can be enlarged as large as possible, and occurrence of a diffraction phenomenon can be prevented.

In the embodiment shown in FIG. 3, the three filters; namely, the clear filter 64a, the IR cutoff filter 64b, and the IR cutoff+ND filter 64c, are provided on the base material 64c. However, it may also be the case where the base material 64d will be provided with only the two filters; namely, the clear filter 64a and the IR cutoff filter 64b and that another ND filter which can be removably inserted to the position of the optical axis P may also be provided. In this case, the IR cutoff filter 64b is placed at the position of the optical axis P during photographing of a high-luminance subject, and another ND filter is placed so as to overlap the IR cutoff filter 64b, thereby diminishing the amount of light. Moreover, when photographing of a subject other than the high-luminance subject, the ND filter is caused to recede from the position of the optical axis P, thereby enabling performance of photographing by use of only the clear filter 64a or the IR cutoff filter 64b.

Figure 6:
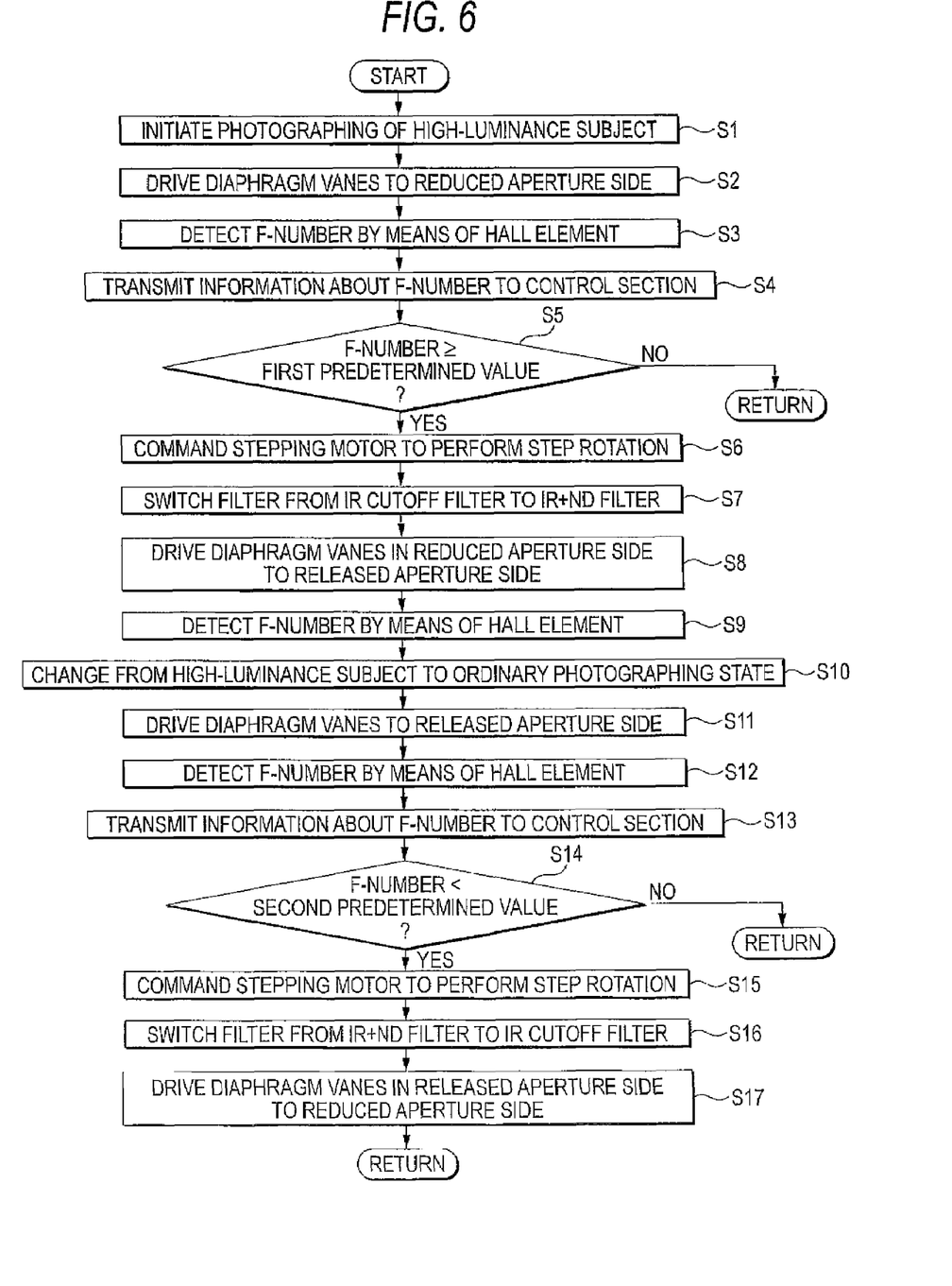
FIG. 6 is a flowchart showing procedures of processing performed in the lens device.
Figure 7:
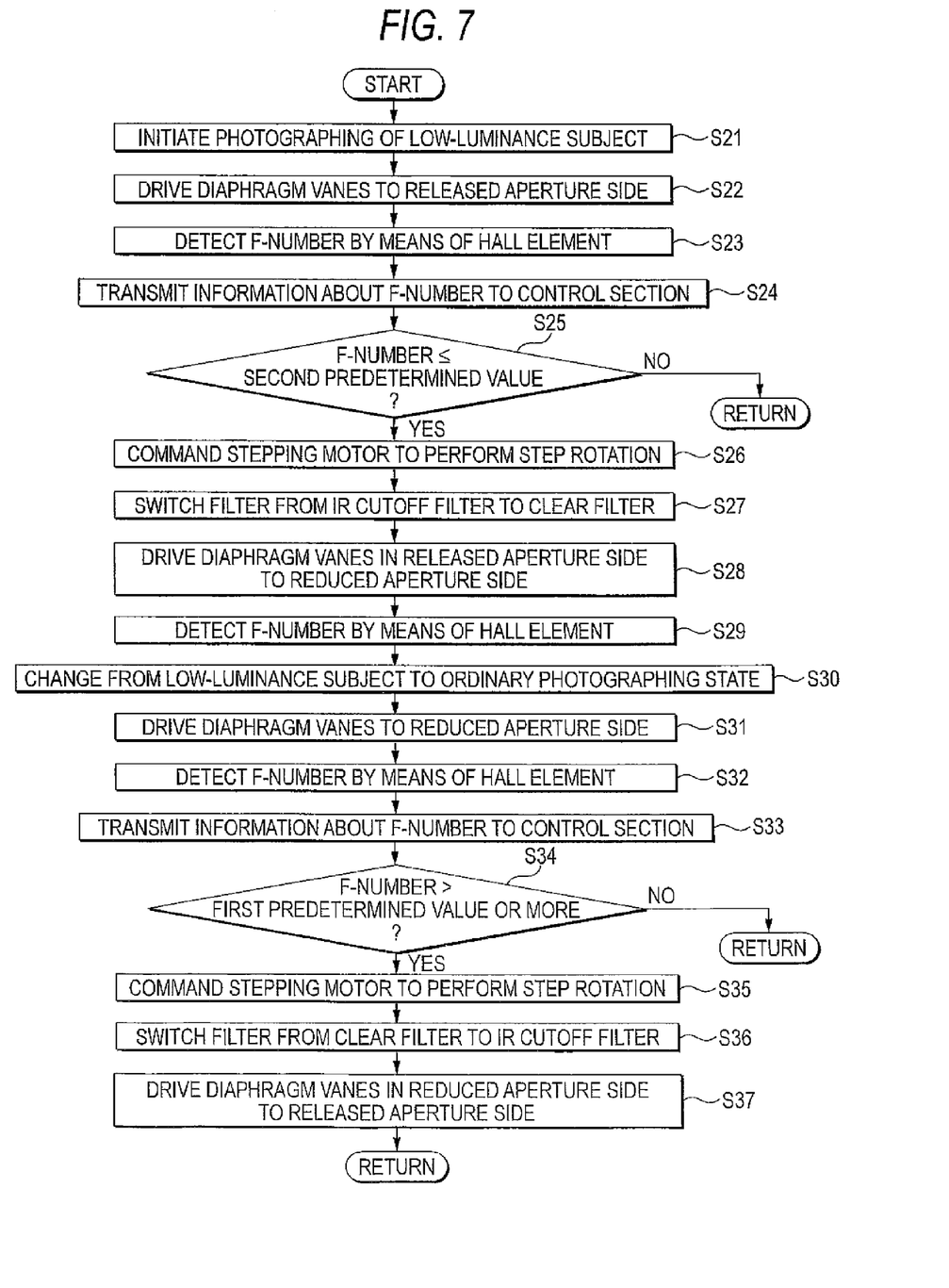
FIG. 7 is a flowchart showing procedures of processing performed in the lens device.

Next, procedures of processing performed by the lens device of the present embodiment will be described by reference to flowcharts shown in FIGS. 6 and 7. First, processing of the flowchart shown in FIG. 6 will be described. The flowchart shown in FIG. 6 shows processing performed when a high-luminance subject is photographed and when a change has arisen from the high-luminance subject to a subject of ordinary luminance.

First, in step S1, photographing of the high-luminance subject is initiated. In step S1, the filter mechanism 64 is assumed to be set to an initial state, and the IR cutoff filter 64b is assumed to be placed at the position of the optical axis P. In next step S2, the CCD 58 detects comparatively-high luminance of the subject, and the diaphragm is driven to a smaller aperture side.

In step S3, the hall element provided in the diaphragm mechanism 30 detects an F-number. In step S4, information about the F-number is sent to the control section 70. In step S5, the control section 70 determines whether or not the F-number is the first predetermined value or more. When the F-number is the first predetermined value or more, processing proceeds to step S6. Here, the first predetermined value is; for example, F8.

When processing has proceeded to step S6, the F-number is the first predetermined value (F8) or more, and hence the diaphragm must be reduced sufficiently. The luminance of the subject is determined to be high. Accordingly, in step S6, in order to switch the filter, a rotational direction and a rotational angle for the drive device 66 are determined, and the rotational direction and the rotational angle are sent, as a command, to the drive device 66. The command is issued by the control section 70.

In the meantime, when the F-number is smaller than the first predetermined value, the luminance of the subject is determined not to be high, and processing is terminated (RETURN). In this case, photographing is performed by use of the IR cutoff filter 64b without involvement of changing of the filter.

In step S7, the drive device 66 receives the command pertaining to the rotational direction and the rotational angle issued in step S6 and is rotated stepwise in a direction of arrow B shown in FIG. 3, whereby the filter mechanism 64 switches the filter. Here, the IR cutoff filter 64b is switched to the IR cutoff+ND filter 64c.

In step S8, as a result of the IR cutoff filter 64b being switched to the IR cutoff+ND filter 64c, the amount of light radiated on the CCD 58 decreases, and hence the diaphragm is released greater than before switching of the filter. In step S9, the hall element provided in the diaphragm mechanism 30 detects an F-number.

In a state achieved in step S9, the filter is switched to the IR cutoff+ND filter 64c so as to conform to the subject of high luminance, and the diaphragm is released greater than before switching of the filter. Accordingly, so long as photographing is performed in this state, photographing can be performed with the diaphragm being released greater than the case where photographing is performed by means of the IR cutoff filter 64b. Therefore, occurrence of diffraction, which would otherwise be caused when light travels through the diaphragm, can be minimized.

In steps subsequent to step S9, processing pertaining to step S10 performed when the subject has changed from high luminance to ordinary luminance will be described. In step S10, a change arises from the high-luminance subject to an ordinary-luminance subject. In step S11, the CCD 58 detects that the subject is of ordinary luminance, and the diaphragm is driven to a released aperture side.

In step S12, the hall element provided in the diaphragm mechanism 30 detects an F-number, and information about the F-number is sent to the control section 70 in step S13. In step S14, a determination is made as to whether or not the F-number is smaller than the previously-described second predetermined value. When the F-number is smaller than the second predetermined value, processing proceeds to step S15. Now, the second predetermined value is; for example, F2.

When processing has proceeded to step S15, the F-number is smaller than the second predetermined value, and hence the subject is determined not to be high luminance. Accordingly, in step S15, in order to switch the filter, a rotational direction and a rotational angle for the drive device 66 are determined, and the rotational direction and the rotational angle are sent, as a command, to the drive device 66.

In the meantime, when the F-number is the second predetermined value or more, the luminance of the subject is determined to be high, and processing is terminated (RETURN). In this case, photographing is performed by use of the IR cutoff+ND filter 64c without involvement of changing of the filter.

In step S16, the drive device 66 receives the command pertaining to the rotational direction and the rotational angle issued in step S15 and is rotated stepwise in a direction of arrow c shown in FIG. 3, whereby the filter mechanism 64 switches the filter. Here, the IR cutoff+ND fitter 64c is switched to the IR cutoff filter 64b.

In step S17, as a result of the IR cutoff+ND filter 64c being switched to the IR cutoff filter 64b, the amount of light radiated on the CCD 58 increases, and hence the diaphragm is reduced greater than before switching of the filter.

In a state achieved in step S17, the filter is switched to the IR cutoff filter 64b so as to conform to the subject of ordinary luminance. Accordingly, ordinary photographing can be performed while the infrared light is cut by means of the IR cutoff filter 64b.

Processing of the flowchart shown in FIG. 7 will now be described. The flowchart shown in FIG. 7 shows processing performed when a low-luminance subject is photographed and when a change has arisen from the low-luminance subject to a subject of ordinary luminance.

First, in step S21, photographing of the low-luminance subject is initiated. In an initial state achieved in step S21, the filter mechanism 64 is assumed to be set to an initial state, and the IR cutoff filter 64b is assumed to be placed at the position of the optical axis P. In next step S22, the CCD 58 detects comparatively-low luminance of the subject, and the diaphragm is driven to a released aperture side.

In step S23, the hall element provided in the diaphragm mechanism 30 detects an F-number. In step S24, information about the F-number is sent to the control section 70. In step S25, the control section 70 determines whether or not the F-number is the second predetermined value or less. When the F-number is the second predetermined value or less, processing proceeds to step S26.

When processing has proceeded to step S26, the F-number is the second predetermined value or less, and hence the luminance of the subject is determined to be low. Accordingly, in step S26, in order to switch the filter, a rotational direction and a rotational angle for the drive device 66 are determined, and the rotational direction and the rotational angle are sent, as a command, to the drive device 66.

In the meantime, when the F-number is greater than the second predetermined value, the luminance of the subject is determined not to be low, and processing is terminated (RETURN). In this case, photographing is performed by use of the IR cutoff filter 64b without involvement of changing of the filter.

In step S27, the drive device 66 receives the command pertaining to the rotational direction and the rotational angle issued in step S26 and is rotated stepwise in a direction of arrow C shown in FIG. 3, whereby the filter mechanism 64 switches the filter. Here, the IR cutoff filter 64b is switched to the clear filter 64a.

In step S28, as a result of the IR cutoff filter 64b being switched to the clear filter 64a, the amount of light radiated on the CCD 58 increases, and hence the diaphragm is reduced greater than before switching of the filter. In step S29, the hall element provided in the diaphragm mechanism 30 detects an F-number.

In a state achieved in step S29, the filter is switched to the clear filter 64a so as to conform to the subject of low luminance. Accordingly, a decrease in the amount of light can be prevented, and the infrared light can be caused to travel through the clear filter 64a. Thus, the subject of low luminance, such as photographing performed at a dark position, can be performed without fail.

In steps subsequent to step S29, processing pertaining to step S13 performed when the subject has changed from low luminance to ordinary luminance will be described. In step S30, a change arises from the low-luminance subject to an ordinary-luminance subject. In step S31, the CCD 58 detects that the subject is of ordinary luminance, and the diaphragm is driven to a reduced aperture side.

In step S32, the hall element provided in the diaphragm mechanism 30 detects an F-number, and information about the F-number is sent to the control section 70 in step S33. In step S34, a determination is made as to whether or not the F-number is greater than the first predetermined value (F8). When the F-number is greater than the first predetermined value, processing proceeds to step S35.

When processing has proceeded to step S35, the F-number is greater than the first predetermined value, and hence the subject is determined not to be low luminance. Accordingly, in step S35, in order to switch the filter, a rotational direction and a rotational angle for the drive device 66 are determined, and the rotational direction and the rotational angle are sent, as a command, to the drive device 66.

In the meantime, when the F-number is the first predetermined value or less, the luminance of the subject is determined to be low, and processing is terminated (RETURN). In this case, photographing is performed by use of the clear filter 64a without involvement of changing of the filter.

In step S36, the drive device 66 receives the command pertaining to the rotational direction and the rotational angle issued in step S35 and is rotated stepwise in a direction of arrow B shown in FIG. 3, whereby the filter mechanism 64 switches the filter. Here, the clear filter 64a is switched to the IR cutoff filter 64b.

In step S37, as a result of the clear filter 64a being switched to the IR cutoff filter 64b, the amount of light radiated on the CCD 58 decreases, and hence the diaphragm is released greater than before switching of the filter.

In the state achieved in step S37, the filter is switched to the IR cutoff filter 64b so as to conform to the ordinary-luminance subject. Accordingly, ordinary photographing can be performed while infrared light is cut by the IR cutoff filter 64b.

In the above descriptions, the F-number at which the IR cutoff+ND filter 64c is switched to the IR cutoff filter 64b and the F-number at which the IR cutoff filter 64b is switched to the clear filter 64a are set to a single value (the second predetermined value). However, they may also assume different values.

As has been described above, according to the present embodiment, the IR cutoff+ND filter 64c is placed in the optical axis P at the time of photographing of a high-luminance subject. Hence, the amount of light can be reduced by means of both the ND filter of the IR cutoff+ND filter 64c and the diaphragm mechanism 30. Therefore, when compared with the case where the amount of light is reduced by means of only the diaphragm mechanism, the amount of light can be reduced further. Therefore, the aperture of the diaphragm can be increased, thereby preventing occurrence of a diffraction phenomenon. Moreover, the densities of the ND filters 50 and 52 provided in the diaphragm mechanism 30 can be reduced, and hence a decrease in the amount of light induced during photographing of a low-luminance subject can be diminished. Therefore, the minimum photographable subject illuminance can be reduced.

Although the preferred embodiment of the present invention has been described by reference to the accompanying drawings, it goes without saying that the present invention is not limited to the embodiment. It is obvious that persons skilled in the art can contrive various alterations or modifications without departing the scope of the appended claims, and the alterations and modifications are naturally construed to fall within the technical scope of the present invention.

According to the present invention, there can be provided a lens device capable of reducing the amount of light while preventing deterioration of image quality at the time of photographing of a high-luminance image.

The entire disclosure of each and every foreign patent application from which the benefit of foreign priority has been claimed in the present application is incorporated herein by reference, as if fully set forth.

What is claimed is:

1. A lens device comprising:
   an image-formation optical system that converges an incident luminous flux at an imaging element, to form an image;
   a diaphragm mechanism, including a pair of moveable vanes provided in the image-formation optical system; and
   a filter section that is provided on a subject side of the imaging element and through which the luminous flux incident on the image-formation optical system travels,
   wherein the filter section comprises: an infrared-ray cutoff filter; and a neutral density filter attached to each vane of the pair of moveable vanes, and
   wherein the lens device further comprises a filter switching mechanism that places the infrared-ray cutoff filter and the neutral density filter attached to each vane of the pair of moveable vanes in a range through which the luminous flux travels at the time of photographing of a high-luminance subject and allows operation with a reduced density of the neutral density filter.

2. The lens device according to claim 1,
   wherein the infrared-ray cutoff filter comprises a first infrared-ray cutoff filter and a second infrared-ray cutoff filter,
   the filter section comprises: the first infrared-ray cutoff filter; and a composite filter into which the second infrared-ray cutoff filter and the neutral density filter are superimposed integrally one on top of the other, and
   the filter switching mechanism places the composite filter in the range through which the luminous flux travels at the time of photographing of a high-luminance subject.

3. The lens device according to claim 2, further comprising:
   an F-number acquisition section that acquires an F-number of the diaphragm mechanism,
   wherein the filter switching mechanism causes the composite filter to recede from the range through which the luminous flux travels when the F-number is a first predetermined value or less and a second predetermined value or above and places the first infrared-ray cutoff filter in the range through which the luminous flux travels.

4. The lens device according to claim 3,
   wherein the filter section further comprises a clear filter that causes the luminous flux to pass through, and
   the filter switching mechanism places the clear filter in the range through which the luminous flux travels, when the F-number is less than the second predetermined value.

5. The lens device according to claim 4,
   wherein the filter switching mechanism places a first neutral density filter within the aperture opening for the image-formation optical system, and superimposes a second neutral density filter on top of the first neutral density filter when reaching an increasingly smaller aperture within the aperture opening for the image-formation optical system.

* * * * *